US011904375B2

(12) United States Patent
Greenleaf

(10) Patent No.: US 11,904,375 B2
(45) Date of Patent: Feb. 20, 2024

(54) FASTENER ENABLED MULTI-PLATE SECUREMENT AND ALIGNMENT ARRANGEMENT

(71) Applicant: Richard J. Greenleaf, Manchester, MA (US)

(72) Inventor: Richard J. Greenleaf, Manchester, MA (US)

( * ) Notice: Subject to any disclaimer, the term of this patent is extended or adjusted under 35 U.S.C. 154(b) by 79 days.

(21) Appl. No.: 17/803,230

(22) Filed: Mar. 21, 2022

(65) Prior Publication Data

US 2023/0294155 A1 Sep. 21, 2023

Related U.S. Application Data

(63) Continuation-in-part of application No. 16/602,167, filed on Aug. 20, 2019, now abandoned, which is a continuation-in-part of application No. 16/501,026, filed on Feb. 11, 2019, now Pat. No. 10,807,269, which is a continuation-in-part of application No. 15/530,236, filed on Dec. 14, 2016, now Pat. No. 10,201,906.

(51) Int. Cl.

| | |
|---|---|
| ***B21D 28/34*** | (2006.01) |
| ***B21D 28/04*** | (2006.01) |
| ***B26F 1/14*** | (2006.01) |
| ***B21D 37/04*** | (2006.01) |
| ***B26D 7/26*** | (2006.01) |
| ***B21D 37/02*** | (2006.01) |

(52) U.S. Cl.

CPC ............ *B21D 28/34* (2013.01); *B21D 28/04* (2013.01); *B21D 37/02* (2013.01); *B21D 37/04* (2013.01); *B26D 7/2628* (2013.01); *B26F 1/14* (2013.01)

(58) Field of Classification Search

CPC ...... F16B 35/004; F16B 35/041; F16B 35/04; F16B 35/042; F16B 35/048; F16B 35/06; F16B 35/02; F16B 35/065; F16B 19/02; B21D 28/34; B26D 11/00

USPC .................................................. 411/424, 399

See application file for complete search history.

(56) References Cited

U.S. PATENT DOCUMENTS

2018/0128301 A1* 5/2018 Rosén .................... F16B 19/02
2020/0158159 A1* 5/2020 Sicard .................. F16B 37/125

OTHER PUBLICATIONS

U.S. Appl. No. 16/602,167, filed Aug. 20, 2019, abandoned.

* cited by examiner

*Primary Examiner* — Jennifer S Matthews
(74) *Attorney, Agent, or Firm* — Don Halgren

(57) ABSTRACT

An elongated securement member for enabling the accurate alignment and securement of a first plate and a second plate together through a configured bore arranged therebetween, the elongated securement member having a first for securement member upper end and a second or securement member lower end. The first or securement member having a longitudinal axis, the upper end of which also having a tapered or wedge inducing non-cylindrical portion, the second or securement member lower end having a threaded portion of a diameter D1 and a middle cylindrical portion of a diameter D2, and an annularly arranged channel formed at a juncture of the tapered or wedge inducing non-cylindrical portion of the securement member upper end and the middle cylindrical portion of diameter D1 of the securement member.

6 Claims, 9 Drawing Sheets

FASTENER ENABLED MULTI-PLATE SECUREMENT AND ALIGNMENT ARRANGEMENT

BACKGROUND OF THE INVENTION

The present application relates to securement and alignment arrangements and more particularly to insertable fastener or securement members for holding multiple rigid plates together in secure and accurate alignment, such as for example holding plates together securely and accurately in a compound tooling punch press machine assembly as represented in and incorporates herein by reference: application Ser. No. 15/731,317, now U.S. Pat. No. 10,384,257, issued 20 Aug. 2019, incorporated herein by reference, and more specifically to gripping plates for securely holding and aligning die members within that gripping plate, is application Ser. No. 16/501,026, now U.S. Pat. No. 10,807,269, issued Oct. 20, 2020 and application Ser. No. 15/530,236, now U.S. Pat. No. 10,201,906, issued Feb. 12, 2019, each of which are incorporated herein by reference.

Discussion of the Prior Art

Compound tooling is currently utilized by hundreds of manufacturers to produce thousands of different types of washers made from aluminum, brass, copper, nylon, steel utilized in almost everything society touches. Washers are for example, utilized in any product with nuts and bolts or moving parts. The inside diameter and the outside diameter of these washers or other punched parts have become more critical and significant for use in the manufacture of high-quality precision devices.

Prior art tool and die sets have to be made slightly loose, and those tools use clamping screws which thus influences a die in a tool holder. That in turn establishes inaccuracies and a loss of concentricity of the alignment of those tools. Recent advances have been improved upon by the present invention which allows adjustment and assembly of multiple gripping arrangements in a single gripping or die holder plate. However, holding of a die holder plate to an ID punch holder plate in the prior art requires multiple screw thread members together with multiple dowels to align and assemble these pieces in an extensive and inefficient manner.

It is thus an object of the present invention to overcome the disadvantages of the prior art.

It is a further object of the present invention to provide an assembly member in which a first plate, or for example, an ID punch holder plate for a punch press and a second plate, or for example, a compound punch holder plate for a punch press, are assembled in simplified, quickly secured alignment with one another.

BRIEF DESCRIPTION OF THE DRAWINGS

The objects and advantages of the present invention will become more apparent, when viewed in conjunction with the following drawings, in which.

BRIEF SUMMARY OF THE INVENTION

Figure 1:
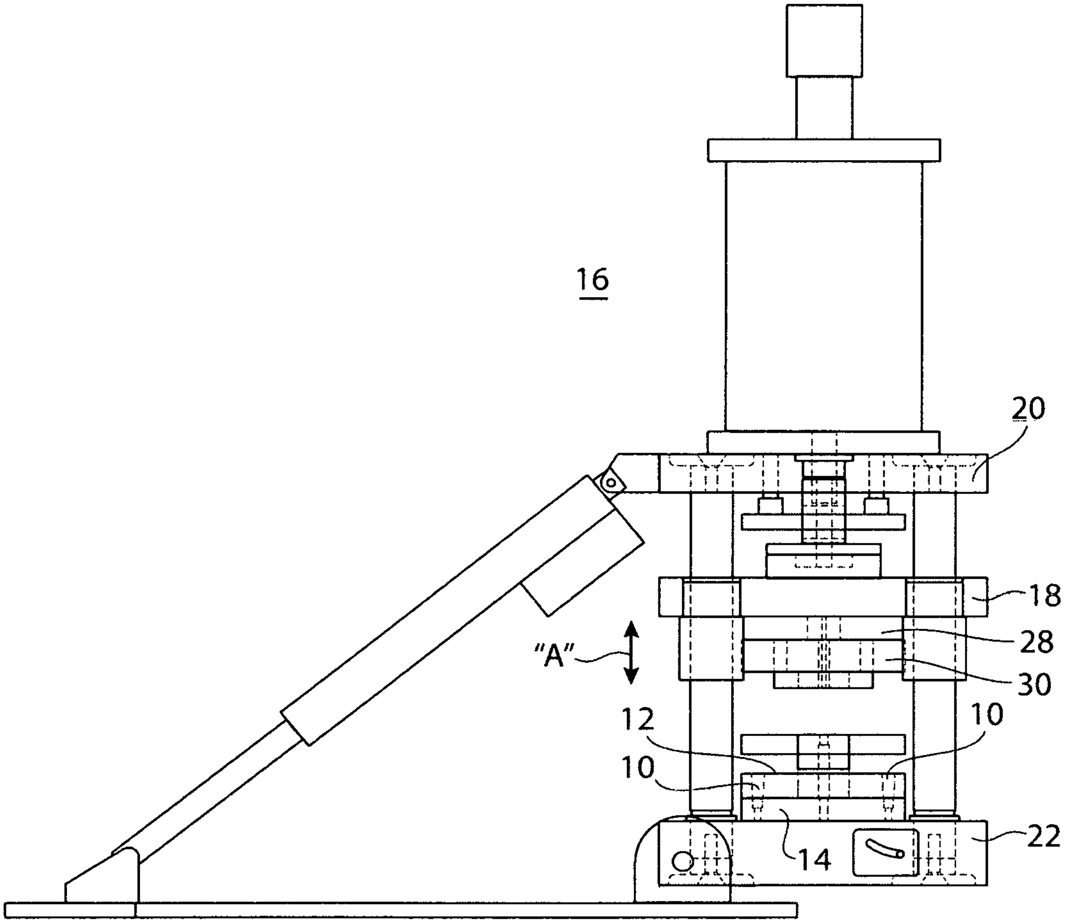
FIG. 1 is a side elevational view of a punch press apparatus showing in an edge view several holder plates which utilize the present fastener invention.

The present invention comprises an elongated assembly securement member for quickly and easily joining in proper alignment two plate members, for example, as those required in a punch press machine. Such a machine of necessity needs a quick tool change arrangement. A reciprocally movable upper support member is arranged on a punch press frame. The system also includes a lower support member arranged on the punch press frame. A pair of tool gripping members are arranged on the upper support member and a pair of tool gripping members are also arranged on the lower support member. For our purposes here, only the tool gripping members for the lower support member will be discussed. The tool gripping members in this instance are a die holder plate and a punch holder plate, both being critically required to be in proper alignment with one another for the parts punching operation to properly proceed.

The plates in this particular assembly are of rectilinear configuration having central openings for the punch press operation to take place. The $1^{st}$ plate is an upper or die holder plate to be secured in close alignment with a lower or $2^{nd}$ immediately adjacent punch holder plate. The $1^{st}$ or upper plate preferably has a plurality of tapered openings and the $2^{nd}$ or lower plate has a corresponding plurality of bores a lower portion of which are threaded.

The upper plate in this compound plate assembly has the tapered $1^{st}$ bore opening extending therethrough with the tapered portion comprising a majority of the thickness of the plate, for example preferably about 75% of its depth. The remaining approximately 25% of the $1^{st}$ bore opening is of cylindrical configuration.

The lower plate in this joined compound plate assembly has a cylindrically shaped $1^{st}$ bore opening and is in corresponding alignment to the tapered $1^{st}$ bore opening of the upper plate. The approximate upper half of the cylindrically shaped $1^{st}$ bore opening in the lower plate is smooth. The approximate lower half of the cylindrically shaped $1^{st}$ bore opening in the lower plate is threaded.

The elongated securement member of the present invention is adapted to properly engage the corresponding openings in the upper plate and the lower plate. The elongated securement member has a $1^{st}$ or upper end and a lower or $2^{nd}$ end. The uppermost end of the securement member may have a crowned surface into which preferably, a tool engageable opening is machined. The annular peripheral surface comprising about one third of the length of the elongated securement member is of tapered or conical configuration, tapered at an angle of about 7 to about 14° with respect to the longitudinal axis of the elongated securement member. The tapered configuration has a distalmost end which defines a circumferentially arranged upper transition perimeter (circular) of a $1^{st}$ diameter.

An annular channel is arranged about the elongated securement member distally adjacent the circumferentially arranged upper transition perimeter. The annular channel has a circumferentially arranged lower transition perimeter (circular) of a $2^{nd}$ diameter. A dowel-like cylindrical portion of the elongated securement member extends distally from the lower transition perimeter for preferably about one third of the length of the elongated securement member. A threaded portion of the elongated securement member comprises the remaining distalmost one third of the elongated securement member. The juncture of the threaded portion and the dowel-like cylindrical portion have a stepped or shoulder arrangement therebetween.

The respective openings in the upper or die holder plate and the lower or punch holder plate comprising the joined assembly have correspondingly tapered and threaded holes respectively so as to permit a snug screwed-in wedging arrangement between the elongated securement member and their respective plates which are secured thereby.

The invention thus comprises a securement arrangement for accurately securing multiple components together such as for example, $1^{st}$ or die holder plate and a $2^{nd}$ or punch holder plate for a punch press assembly, each of which plate has a central tool opening whose alignment is critical to the functioning of a tool arranged therewithin, the die holder (upper) plate and the punch holder (lower) plate each having a plurality of corresponding securement-member-receiving irregularly-profiled bores extending therethrough in longitudinal alignment with one another along a longitudinal axis, for snug receipt, respectively, of their respective securement members, enabling fast and simple change of tools within the central openings, and wherein each bore in the die holder plate has an upper portion profile tapered area of between 7° and 14° with respect to its longitudinal axis, and has a cylindrically shaped lower portion; and each bore of the die holder plate has a lower portion profile of cylindrical configuration of a $1^{st}$ diameter D1, the upper portion tapered area and the cylindrically shaped lower portion meeting at an annular bore-wall-defined transition junction; and wherein each bore of the punch holder plate has an upper portion profile of cylindrical configuration also of a $1^{st}$ diameter D1, and a lower threaded portion profile of reduced $2^{nd}$ diameter D2; and an arrangement of elongated securement members each having a longitudinal axis, and each arranged for respective receipt into a respective aligned pair of bores in a die holder plate and a punch holder plate, each of the elongated securement members having a uppermost or $1^{st}$ end tapered portion of between 7° and 14° with respect to its longitudinal axis, the elongated securement member also having an intermediate cylindrical portion of a $1^{st}$ diameter D1 and also having a threaded lower or distalmost portion of cylindrical configuration of a $2^{nd}$ diameter D2, wherein the tapered portion meets the intermediate cylindrical portion at a transition juncture; and wherein the transition juncture consists of an annular strain relief channel therearound. The annular strain relief channel has a lowermost deep portion which is preferably in locational correspondence with annular bore wall defined transition junction. The annular strain relief channel may preferably have a radius of curvature of about 0.430 inches to about 0.440 inches. The annular strain relief channel has a depth of about 0.015 inches to about 0.020 inches. The $1^{st}$ diameter D1 is larger than the $2^{nd}$ diameter D2. The uppermost or $1^{st}$ end of the securement member preferably has an end surface of hemispherical-like configuration. The end surface of the securement member may have a machined opening therein for receivable engagement with a turning tool for turning the elongated securement member.

The invention also comprises an elongated securement member for enabling the accurate alignment and securement of a $1^{st}$ plate and a $2^{nd}$ plate together through a configured bore arranged therebetween, the elongated securement member having a $1^{st}$ or securement member upper end and a $2^{nd}$ or securement member lower end; the elongated securement member having a longitudinal axis and also having a tapered upper end or wedge-inducing non-cylindrical portion, the securement member lower end having a threaded portion of a diameter D2 and a middle cylindrical-portion of a diameter D1, and an annularly arranged strain reducing channel formed at a juncture of the tapered or wedge inducing non-cylindrical portion of the securement member upper end and the middle cylindrical portion of diameter D1 of the securement member lower end. The annularly arranged channel formed at the juncture of the tapered or wedge inducing non-cylindrical portion of the securement member upper end has an upper transition perimeter therearound, of an upper transition perimeter diameter D3 and the lower transition perimeter formed at the juncture of the annularly arranged channel and the middle cylindrical portion of having a diameter D1, wherein the upper transition perimeter diameter D3 is larger than the upper transition diameter D1. The wedge inducing non-cylindrical portion is tapered at an angle of about 7° to about 14° with respect to the longitudinal axis of the elongated securement member. The threaded portion diameter D2 is smaller than the upper transition diameter D1 of the securement member. The annular channel preferably may have a radius of curvature of about 0.430 to about 0.440 inches, and the depth of about 0.015 to about 0.020 inches.

The invention also comprises an assembly comprised of a $1^{st}$ plate and a $2^{nd}$ plate secured together by an elongated securement member, wherein the $1^{st}$ plate has an irregular $1^{st}$ bore extending therethrough and the $2^{nd}$ plate has an irregular $1^{st}$ bore extending therethrough, the $1^{st}$ bore in the $2^{nd}$ plate arranged in longitudinal alignment with the $1^{st}$ bore in the $1^{st}$ plate, the $1^{st}$ bore in the $1^{st}$ plate having an upper end of conical configuration and a lower end of cylindrical configuration, wherein the conical configuration and the cylindrical configuration meet and define in the $1^{st}$ bore in the $1^{st}$ plate, an intermediate circular transition perimeter juncture of X diameter, wherein the $1^{st}$ bore in the $2^{nd}$ plate has an upper end of cylindrical configuration of X diameter and a lower end of Y diameter, wherein the X diameter is larger than the Y diameter, the assembly includes an elongated securement member of correspondingly irregular configuration when it extends through the $1^{st}$ bore of the $1^{st}$ plate and into the lower end of the $1^{st}$ bore in the $2^{nd}$ plate, the elongated securement member having an upper or proximalmost end of conical configuration and an intermediate portion of cylindrical shape, the conical configuration and the intermediate portion having a strain relief channel shaped juncture, the elongated securement member having a threaded lower or distalmost end portion of Y diameter, and wherein the strain relief channel shaped juncture has an annular nadir which positionally corresponds to the intermediate circular transition-perimeter-juncture arranged within the irregular bore of the upper or $1^{st}$ plate. The lower end of the $1^{st}$ bore in the $2^{nd}$ plate threadably receives the lower or distalmost end of the elongated securement member. The upper end of the elongated securement member may be of hemispherical or dome-like configuration. The upper end of the elongated securement member may have a socket arranged therein to enable a tool to turn the elongated securement member into the lowermost portion of the threaded $2^{nd}$ plate.

The invention also comprises an elongated fastener device for enabling the securement of a first thin plate and a second thicker plate together, the elongated device consisting of three portions of generally equal length, a proximal or upper first portion, an intermediate or middle portion and a lower or distal portion; wherein the first portion of the elongated fastener device comprises a smooth conical side surface from an upper end thereof, which side surface is tapered at an angle of between 7° to 14° with respect to a longitudinal axis of the elongated device, the smooth conical surface having a lower end ending at a first transition perimeter of a first strain relief channel; wherein the second portion of the elongated fastener device comprises the first strain relief channel, a second transition perimeter of smaller diameter than the first transition perimeter thereof, the second portion extending distally and of cylindrical shape and a diameter equal to the diameter of the first transition perimeter of the first strain relief channel and is arranged so as to be able to extend from the second transition perimeter at the juncture of a first plate and into a bore of a second thicker plate, the second portion of the elongated fastener device distally ending at a first transition perimeter of a second strain relief channel; and wherein third portion of the elongated fastener device comprises a second strain relief channel defined by an uppermost first transition channel and a lowermost second transition channel with a treaded section extending therefrom distally to the distalmost end of the elongated fastener device; and wherein a threaded bore extends into the threaded section of the third portion of the elongated fastener device, and a threaded bore extends into the first portion of the elongated fastener device, to enable rotation engagement with a first and a second plate being joined, from either side thereof.

The elongated fastener device wherein the upper end of the first portion comprises curvilinear surface through which the threaded bore extends. The elongated fastener device wherein in the first transition perimeter of first strain relief channel in the second portion of the elongated faster device is arranged to lie at the juncture of a first plate and a second plate where the elongated fastener device is arranged to extend between and secure a first plate to a second plate. The die plate and holding plate securement arrangement of a punch press machine assembly comprising an elongated fastener device for enabling the securement of a first thin plate and a second thicker plate together, the elongated device consisting of three portions of generally equal length, a proximal or upper first portion, an intermediate or middle portion and a lower or distal portion; wherein the first portion of the elongated fastener device comprises a smooth conical side surface from an upper end thereof, which side surface is tapered at an angle of between 7° to 14° with respect to a longitudinal axis of the elongated device, for smoothly compressing a corresponding conically shaped bore in the first thin plate, the smooth conical surface having a lower end ending at a first transition perimeter of a first strain relief channel; wherein the second portion of the elongated fastener device comprises the first strain relief channel, a second transition perimeter of smaller diameter than the first transition perimeter thereof, the second portion extending distally and of cylindrical shape and a diameter equal to the diameter of the first transition perimeter of the first strain relief channel and is arranged so as to be able to extend from the second transition perimeter at the juncture of the first plate and into a bore of the second thicker plate, the second portion of the elongated fastener device distally ending at a first transition perimeter of a second strain relief channel within the second plate; and wherein third portion of the elongated fastener device comprises a second strain relief channel defined by an uppermost first transition channel and a lowermost second transition channel with a treaded section extending therefrom distally to the distalmost end of the elongated fastener device; and wherein a threaded bore extends into the threaded section of the distalmost end of the third portion of the elongated fastener device, and a threaded bore extends into the first portion of the elongated fastener device, to enable adjustable rotation engagement with the first and the second plate being adjustably joined, from either end or side thereof.

The die plate and holding plate securement arrangement of a punch press machine assembly, includes wherein the second strain relief channel is arranged between the second portion of the elongated fastener device and the treaded section of the third portion of the elongated fastener device.

DETAILED DESCRIPTION OF THE DRAWINGS SHOWING THE PRESENT INVENTION

Referring now to the drawings in detail, and particularly to FIG. 1, there is shown the present invention in use, which invention comprises an elongated assembly securement member 10 for quickly and easily joining into proper alignment two plate members 12 and 14, for example, such as those required in a punch press machine 16. Such a machine 16 of necessity needs a quick tool change arrangement facilitated by changing these tool carrying plate members (upper) 12 and (lower) 14, which are utilized as discussed hereinbelow.

Figure 2:
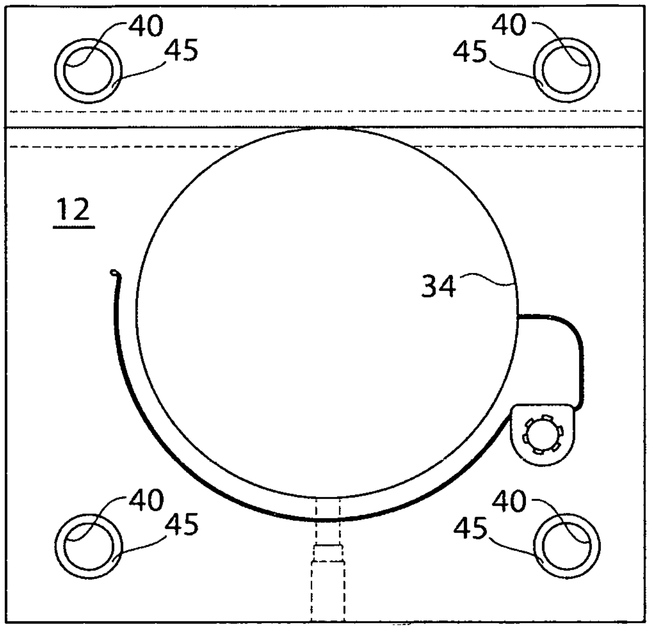
FIG. 2 is a plan view of a die holder plate shown in an edge view in FIG. 1 indicating where the present fastener invention is utilized.
Figure 3:
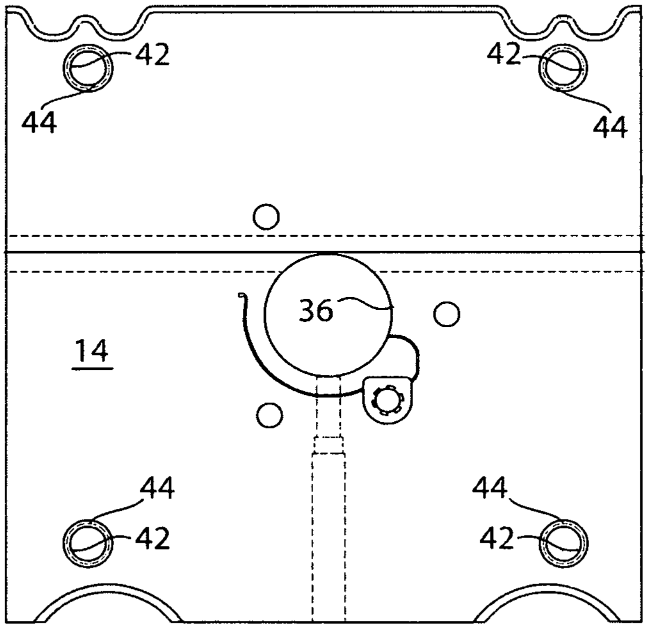
FIG. 3 is a plan view of a punch holder plate shown in an edge view in FIG. 1 indicating where the present fastener invention is utilized.
Figure 4:
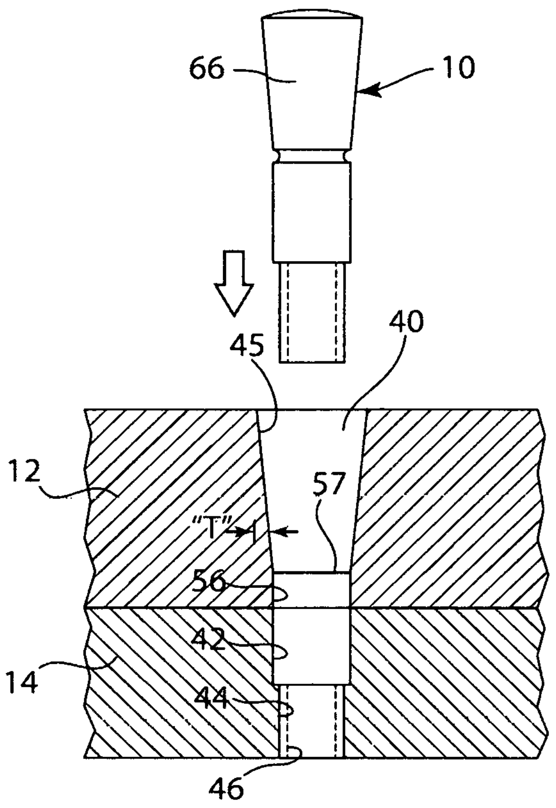
FIG. 4 is a side elevational view of a fastener constructed according to the principles of the present invention in alignment with a receiving bore in an overlapping die holder and punch holder plate arrangement as represented in FIGS. 2 and 3, enabling those plates to be joined securely into the precise alignment needed.
Figure 6:
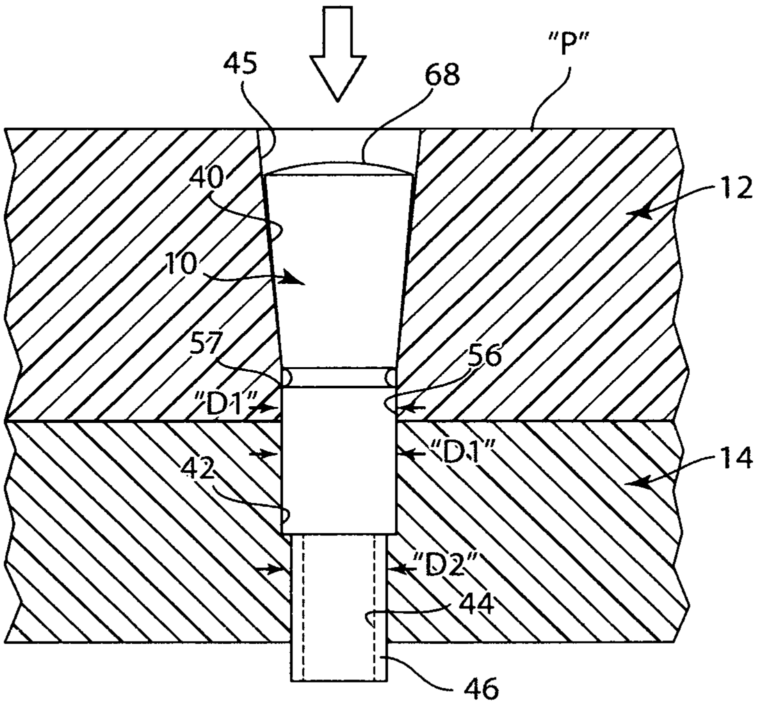
FIG. 6 is a side elevational view of a die holder plate and a punch holder plate shown joined together in proper alignment as a compound plate assembly with a securement member of the present invention shown alignably and grippingly arranged therethrough.

A reciprocally movable (as represented by arrow "A") upper support member 18 is arranged on a system comprising here, a punch press frame 20. This system also includes a lower support member 22 arranged on the punch press frame 20. A pair of tool gripping members are arranged on the upper support member 18 and a pair of tool gripping members 28 and 30 are also arranged on the lower support member 22. For our purposes here, only the tool gripping member arrangement (plates 12 and 14) for the lower support member 22 will be discussed, as represented in FIGS. 2 and 3. The tool gripping members 12 and 14 in this instance are an (upper) die holder plate12 and a (lower) punch holder plate 14, both being critically required to be in proper alignment with one another, as represented in FIGS. 1, 4 and 6 for the parts punching operation to properly proceed, as represented in my U.S. Pat. Nos. 8,925,435, and 9,561,534, both incorporated herein by reference.

The (upper and lower) plates 12 and 14 in this particular assembly are of rectilinear configuration, as may be seen in FIGS. 2 and 3, each having central punch-tool-accommodating openings 34 and 36 respectively, for the punch press operation to take place. The 1$^{st}$ plate is an upper or die holder plate 12 to be secured in close tool-hole alignment with a lower or 2$^{nd}$, immediately adjacent punch holder plate 14, as may be seen in FIGS. 1, 4 and 6. The 1$^{st}$ or upper plate 12 has a plurality of bores 40, with tapered portions 45 and the 2$^{nd}$ or lower plate 14 has a corresponding plurality of cylindrical bores 42 with a lower portion 44 which is of smaller diameter and is threaded, as also represented in FIGS. 4 and 6. The respective, adjacent, longitudinally aligned, multi-configured bores or openings 40 and 42, change their respective side elevational profiles/contours, from a tapered portion 45 in the upper end, to a cylindrical shape of a first diameter "D1", also in the upper plate 12, (best seen in FIG. 6), then similarly configured in the lower plate 14 to a corresponding first diameter "D1" of cylindrical shape, thence to a smaller second diameter "D2", which is the threaded bore 45 when those openings 40 and 42 are in longitudinal alignment with one another, which together comprise punch press machine securement-member-receiving bores, particularly desirable for alignment-critical punch press machine use, as first shown in FIG. 1, and shown more explicitly in FIG. 6.

The bore 40 in the upper plate 12 in this compound plate assembly has the tapered 1$^{st}$ bore section 45 extending therethrough with the tapered portion comprising a majority of the thickness of the upper plate 12, for example, preferably about 75% of its depth, as represented in FIGS. 4 and 6. The remaining approximately 25% of the 1$^{st}$ bore opening 40 is of cylindrical configuration 56 of the first diameter "D1". The juncture of the tapered portion 45 and the cylindrical portion 56 of the bore 40 in the upper plate 28 defines a bore shape profile changing first-transition-junction annular perimeter 57, as may be best seen in FIG. 4.

The lower plate 14 in this joined compound plate assembly has a cylindrically shaped 1$^{st}$ bore opening 42 and is in corresponding longitudinal alignment with the tapered 1$^{st}$ bore opening 40 of the upper plate 12, as represented in FIGS. 4 and 6. The approximate upper half of the cylindrically shaped 1$^{st}$ bore opening 42 in the lower plate 14 is smooth and the approximate lower half of the cylindrically shaped 1$^{st}$ bore opening 44 in the lower plate 14 is threaded 46, as again represented in FIGS. 4 and 6.

Figure 5:
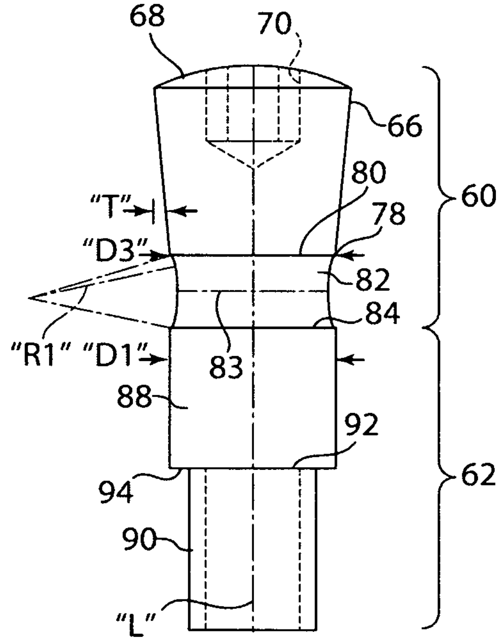
FIG. 5 is an enlarged side elevational view of the fastener member represented in FIG. 4, constructed according to the principles of the present invention.

One preferred embodiment of the elongated securement member 10 of the present invention, as best represented in FIG. 5, is adapted to properly engage the corresponding openings in the upper plate 12 and the lower plate 14, as best represented in FIG. 6. The elongated securement member 10, shown in FIG. 5, has a 1$^{st}$ or upper end portion 60 and a lower or 2$^{nd}$ end portion 62. The uppermost end of the securement member 10 in this embodiment has a crowned or somewhat hemispherical-like surface 68 into which a turn-tool-receivably-engageable opening or socket 70 is machined, as represented in FIG. 5. The securement member 10 has an upper (proximalmost) annular conically shaped surface 66, represented in FIGS. 4 and 5, comprising about one third of the length of the elongated securement member 10 and is of tapered configuration, tapered at an angle "T" of about 7 to about 14° with respect to the longitudinal axis "L" of the elongated securement member 10, as best represented in FIG. 5. The tapered configuration has a lowermost end 78 which defines a circumferentially arranged upper transition perimeter 80 (circular) of a 3rd diameter "D3".

An annular channel 82, best seen in FIG. 5, functions as a strain relief and is arranged about the elongated securement member 10 distally adjacent the circumferentially arranged upper transition perimeter 80. The annular channel 82 has an annular low point or annular nadir 83 circling therearound. The annular low point 83 corresponds positionally with the transition junction 57, shown in FIG. 6, when the securement member 10 is fully in place securing the 1$^{st}$ or upper plate 12 to the lower or 2$^{nd}$ plate 14, as represented in FIG. 6. The annular channel 82 has a circumferentially arranged lower transition perimeter 84 (circular) of a diameter "D1", shown in FIG. 5. The annular channel 82 has a preferred radius of curvature "R1" of about 0.430 to about 0.440 inches, preferably about 0.437 inches and a depth "L" of about 0.015 to about 0.020 inches, for a standard securement member 10. The diameter D3 of the circular upper transition perimeter 80 is larger than the diameter D1 of the circular lower transition perimeter 84, as represented in FIG. 5. As represented in FIG. 5, the dowel-like cylindrical portion 88 of the elongated securement member 10 extends distally from the lower transition perimeter 84 for about one third of the length of the elongated securement member 10, having a diameter corresponding fittingly to the diameters of the cylindrical portion 56 in the upper plate 12 and to the (non-threaded) smooth cylindrical portion 42 of the lower plate 14. A threaded portion 90 of the elongated securement member 10 comprises the remaining distalmost one third of the elongated securement member 10, as seen in FIG. 5. The juncture 92 of the threaded portion 90 and the dowel-like cylindrical portion 88 of the securement member 10, has a shoulder arrangement 94 therebetween, which shoulder portion extends radially outwardly of the threaded portion of the distal portion of the securement member 10. The lower transition perimeter (as for example, lower transition perimeter 84), is preferably the peripheral location of the half-way point in the embodiments of the elongated securement member of the present invention.

The respective openings in the upper or die holder plate 12 and the lower or punch holder plate 14 comprising the joined assembly, represented in FIG. 6, have correspondingly tapered and threaded holes respectively so as to permit a snug, screwed-in wedging arrangement between the elongated securement member 10 and their respective plates 12 and 14 which are secured thereby, effective eliminating the typical need for separate dowels and bolts/screws associated with the prior art punch press assemblies. The crowned surface 68 of this first embodiment of the securement member 10 is arranged to preferably lie below the plane "P" of the upper plate 28, as represented in FIG. 6.

Figure 7:
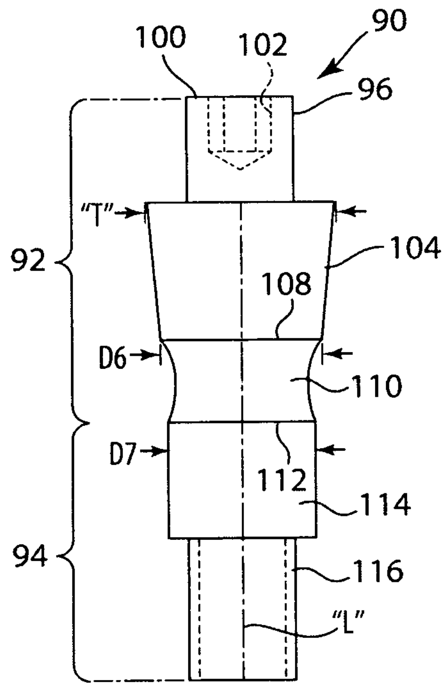
FIG. 7 is an enlarged side elevational view of a further embodiment of the fastener member represented in FIG. 5, constructed according to the principles of the present invention.
Figure 8:
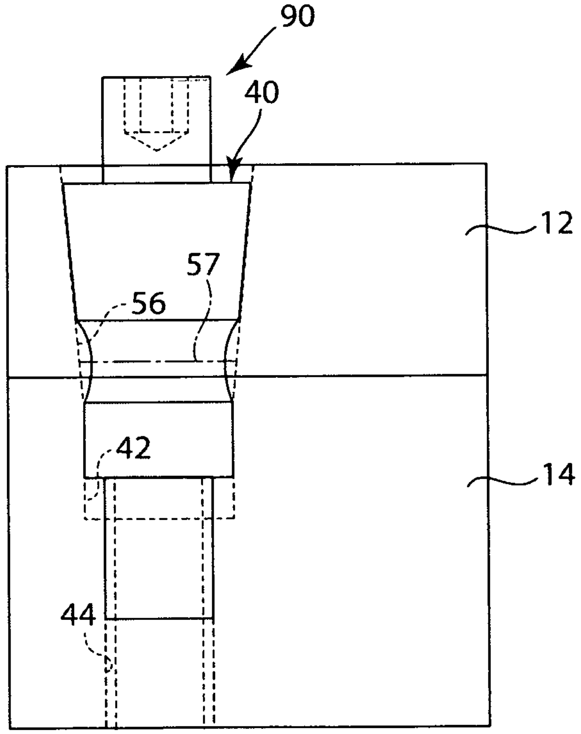
FIG. 8 is an exemplary side elevational view of a die holder plate and a punch holder plate shown joined together as a compound plate assembly with a securement member of the present invention represented in FIG. 7 shown alignably and grippingly arranged therethrough.

A $2^{nd}$ embodiment of the present invention is an elongated securement member 90, shown in FIGS. 7 and 8, having a $1^{st}$ or upper end portion 92 and a $2^{nd}$ or lower end portion 94. The uppermost end portion 96 of the upper end 92 of the securement member 90 proximal of the tapered portion 104 in this embodiment, comprises the cylindrical or upper end dowel-shaped portion 96 with a flat proximalmost upper surface 100 thereon through which a turn-tool-receivable-engageable opening or socket 102 is machined. The securement member 90 has an upper or proximalmost conically shaped surface 104 comprising about ⅓ the length of the elongated securement member 90 and is of tapered configuration, tapered at an angle "T" of about 7 to about 14° with respect to its longitudinal axis "L", as represented in FIG. 7. The tapered configuration has a lowermost end which defines a circumferentially arranged upper transition perimeter 108, which is of a $3^{rd}$ diameter "D6".

An annular channel 110, best seen in FIG. 7, functions as a strain relief and is arranged about the elongated securement member 90 distally adjacent the circumferentially arranged upper transition perimeter 108. The annular channel 110 has a circumferentially arranged lower transition perimeter 112 which is circular, with a diameter "D7", which is less than the diameter "D6" of the upper transition perimeter 108. The annular channel 110 may have a radius of curvature and depth corresponding to that of the aforementioned embodiment, all of course depending upon the full-size of the securement member 90. A dowel-like cylindrical portion 114 of the elongated securement member 90 extends distally from the lower transition perimeter 112 for about ⅓ of the length of the elongated securement member 90, having a diameter correspondingly fitted to the diameters of the cylindrical portions 56 of the upper plate 12. Distal of dowel-like cylindrical portion 114 is the lower or distalmost portion of the securement member 90, which is the threaded portion 116 thereof. Such securement member 90 is shown in FIG. 8 arranged in a $1^{st}$ or upper plate 12 and a $2^{nd}$ or lower plate 14 in a manner corresponding to the aforementioned embodiment, with similar numberings as shown in the earlier figures.

Figure 9:
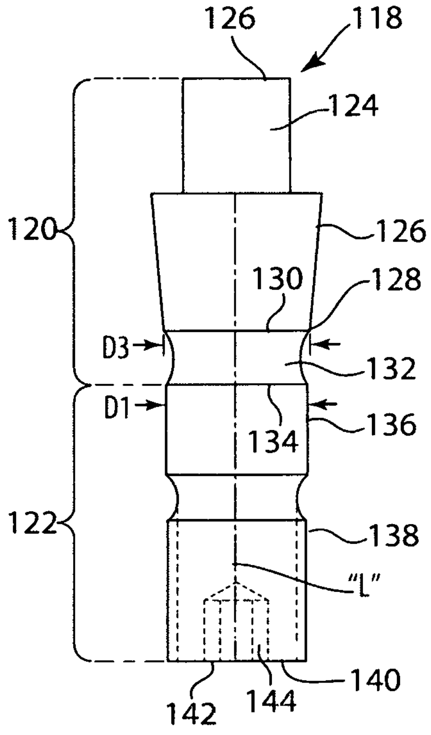
FIG. 9 is an enlarged side elevational view of a yet further embodiment of the fastener member represented in FIG. 5, constructed according to the principles of the present invention.
Figure 10:
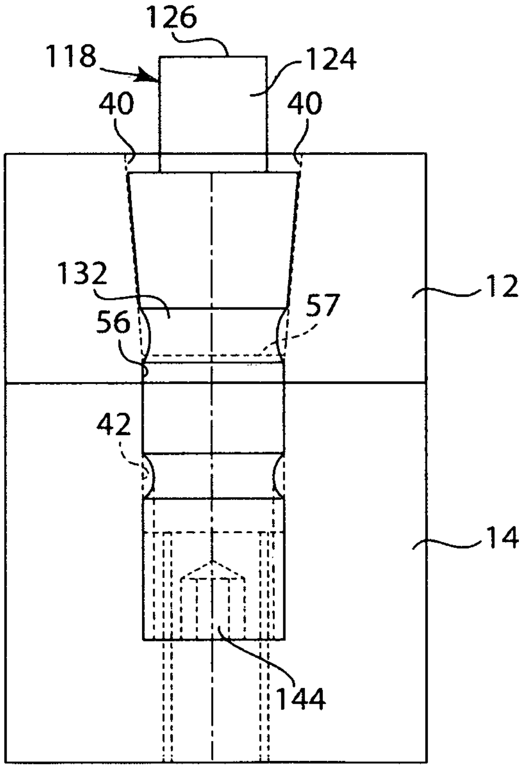
FIG. 10 is an exemplary side elevational view of a die holder plate and a punch holder plate shown joined together as a compound plate assembly with a securement member of the present invention represented in FIG. 9 shown alignably and grippingly arranged therethrough.

A $3^{rd}$ embodiment of the present invention is an elongated securement member 118 represented in FIG. 9. The elongated securement member 118, shown in FIG. 9, and also arranged within a $1^{st}$ or upper plate 12 and a $2^{nd}$ or lower plate 14 is represented in FIG. 10, has a $1^{st}$ or upper-half end portion 120 and a lower-half or $2^{nd}$ end portion 122. An upper or proximalmost most end 124 (which extends above the planar surface as shown in FIG. 10), of the upper half end portion 120 is of cylindrical shape and has a flat upper or proximalmost end 126. The securement member 118 has a conically shaped surface 126 comprising about one $3^{rd}$ of the length of the elongated securement member 118, tapered at an angle "T" of about 7 to about 14° with respect to its longitudinal axis "L", as represented in FIG. 9. The tapered configuration 126 has a lowermost end 128 which defines a circumferentially arranged upper transition perimeter 130, which is circular and has a $3^{rd}$ diameter "D3".

An annular channel 132, best seen in FIG. 9, functions as a strain relief and is arranged about the elongated securement member 118 distally adjacent the circumferentially arranged upper transition perimeter 130 annular channel 132 has a circumferentially arranged lower transition perimeter 134 which is circular and has a diameter "D1". The annular channel 132 may have preferred radius of curvature similar to those of the aforementioned embodiments. The diameter D3 of the upper circular transition perimeter 130 is larger than the diameter D1 of the lower transition perimeter 134. A dowel-like cylindrical portion 136 of the elongated securement member 118 extends distally from the lower transition perimeter 134 for about one $3^{rd}$ of the length of the elongated securement member $2^{nd}$ end portion 122, having a diameter corresponding fittingly to the diameters of a cylindrical portion 56 in the upper plate 12 into the non-threaded smooth cylindrical portion 42 of the lower plate 14. A threaded portion 138 of the elongated securement member 118 comprises the remaining distalmost $3^{rd}$ of the elongated securement member 118 as seen in FIG. 9. The distalmost end 140 of the elongated securement member 118 may have a tool engaging socket or opening 144 therein for receipt of an adjustment device such as an Allen wrench or the like to enable the turning of the securement member from its bottom or lowermost end.

Figure 11:
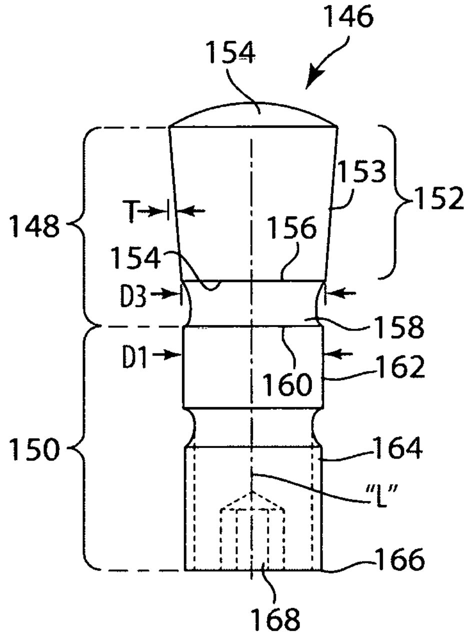
FIG. 11 is an enlarged side elevational view of still yet a further embodiment of the fastener member represented in FIG. 5, constructed according to the principles of the present invention.
Figure 12:
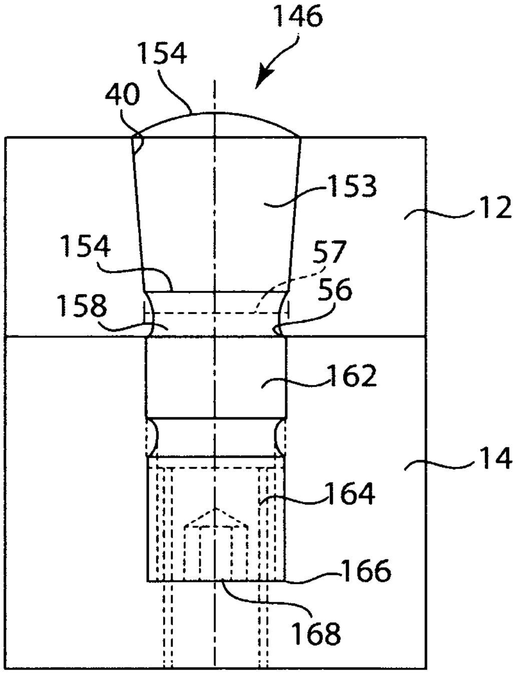
FIG. 12 is an exemplary side elevational view of a die holder plate and a punch holder plate shown joined together as a compound plate assembly with a securement member of the present invention represented in FIG. 11 shown alignably and grippingly arranged therethrough.

A $4^{th}$ embodiment of the present invention is an elongated securement member 146 represented in FIG. 11. The elongated securement member 146, shown in FIG. 11, and also shown arranged within a $1^{st}$ or upper plate 12 and a $2^{nd}$ or lower plate 14 is also represented in FIG. 12, has a $1^{st}$ or upper half end portion 148 and a lower half or $2^{nd}$ end portion 150. An uppermost end 152 has an upper or proximal most curved surface 154. The uppermost end 152 has a surface 153, of conical shape, tapered at an angle "T", critically about 7 to 14° with respect to its longitudinal axis "L", as represented in figure during assembly 11, for smooth entry. The tapered surface 153 as a lowermost end 154 which defines a circumferentially arranged upper transition perimeter 156 which is circular and may be of a diameter D3. An annular channel 158, best seen in FIG. 11, and functions as a strain relief, and is arranged about the elongated securement member 146 distally adjacent the circumferentially arranged upper transition perimeter 156, wherein the annular channel 158 has a circumferentially arranged lower transition perimeter 160 which is circular and has a diameter D1. The annular channel 158 may have a preferred radius of curvature similar to those of the aforementioned embodiments. The diameter D3 of the upper circular transition perimeter 156 is larger than the diameter D1 of the lower transition diameter 160. A dowel-like or cylindrical portion 162 of the elongated securement member 146 extends distally from the lower transition member 160 for about one $3^{rd}$ the length of the elongated lower portion 150 of the securement member 146, having a diameter correspondingly to the diameters of a cylindrical portion 56 of upper plate 12 into the non-threaded smooth cylindrical portion 42 of the lower plate 14. A threaded portion 164 of the elongated securement member 146 comprises the remaining distalmost portion of the elongated securement member as may be seen in FIG. 11. The distalmost end 166 preferably has a tool engaging socket opening 168 therein for receipt of an adjustment device such as an Allen wrench or the like to enable turning the securement member 146 within the respective longitudinally aligned bores in the upper or $1^{st}$ plate 12 and the lower or $2^{nd}$ plate 14, from the lowermost end of the elongated securement member.

Figure 13:
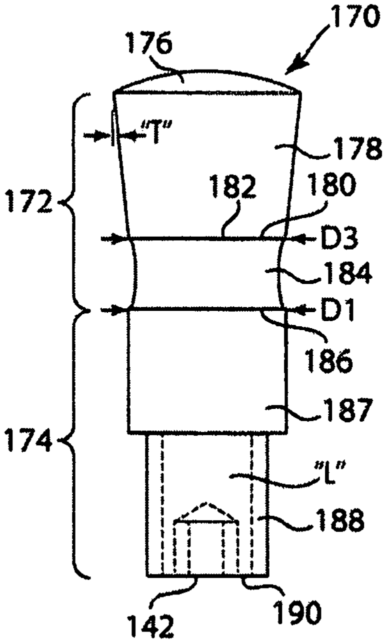
FIG. 13 is an enlarged side elevational view of yet still another embodiment of the fastener member represented in FIG. 5, constructed according to the principles of the present invention.
Figure 14:
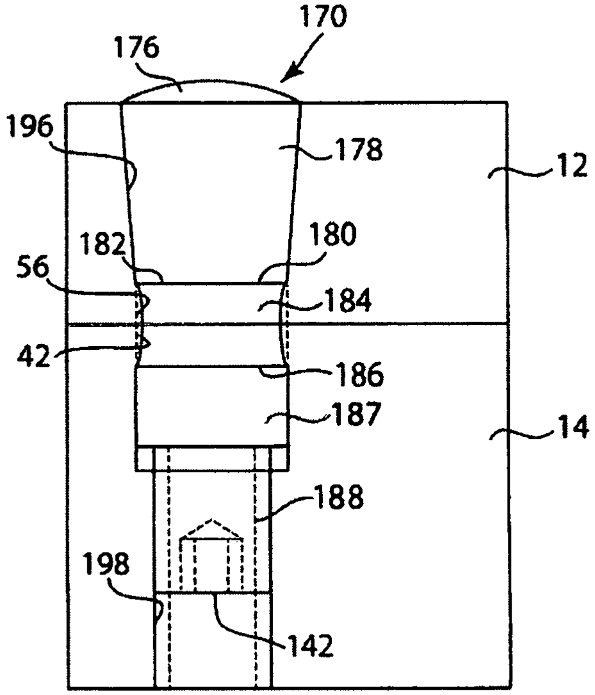
FIG. 14 is an exemplary side elevational view of a die holder plate and a punch holder plate shown joined together as a compound plate assembly with a securement member of the present invention represented in FIG. 13 shown alignably and grippingly arranged therethrough.

A $5^{th}$ embodiment of the present invention is an elongated securement member 170 represented in FIG. 13. The elongated securement member 170, shown in FIG. 13 and also arranged within a $1^{st}$ or upper plate 12 and a $2^{nd}$ or lower plate 14, is represented in FIG. 14, and has an upper-half end portion 172 and a lower-half or a $2^{nd}$ end portion 174. The uppermost end 176 of the upper half end portion 172 is of somewhat domed or hemispherical shape. The securement member 170 has an upper, proximal most conically shaped surface 178 comprising about one $3^{rd}$ of the length of the elongated securement member 170, tapered at an angle "T" of about 7 to about 14° with respect to its longitudinal axis "L", as represented in FIG. 13. The tapered configuration 178 has a lowermost end 180 which defines a circumferentially arranged upper transition perimeter 182 which is circular and may be of a diameter D3.

An annular channel 184, best seen in FIG. 13, functions as a strain relief and is arranged about the elongated securement member 170 distally adjacent the circumferentially arranged upper transition perimeter 182, wherein the annular channel 184 has a circumferentially arranged lower transition perimeter 186 which is circular and has a diameter D1. The annular channel 184 may have a preferred radius of curvature similar to those in the aforementioned embodiments. The diameter D3 of the upper circular transition perimeter 182, shown in FIG. 13 is larger than the diameter D1 of the lower transition perimeter 187. A dowel-like threaded cylindrical portion 188 of the elongated securement member 170 extends distally from the lower transition perimeter 187 about one third of the length of the lower portion 174 of the elongated securement member 170, having a diameter correspondingly fitted to the diameters of a cylindrical portion 56 in the upper plate 12 and into the non-threaded smooth cylindrical portion 42 of the lower plate 14. The threaded portion 188 of the distalmost portion of the elongated securement member 170 comprises about the remaining distalmost one-half to one-third of the lower portion 174 of the elongated securement member 170, as seen in FIG. 13. The distalmost threaded portion 190 of the elongated securement member 170 has a tool engaging socket opening 142, as may be seen in FIG. 13, therein for receipt of an adjustment device such as an Allen wrench of the like for the turning of the securement member 170 from a lower or bottom end thereof when the securement member is registered within the commonly aligned bores 196 and 198 in the $1^{st}$ and $2^{nd}$ plates 12 and 14, as represented in FIG. 14.

Figure 15:
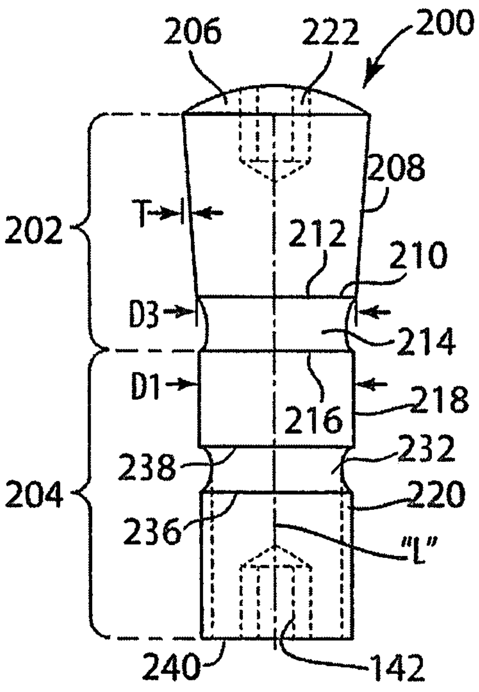
FIG. 15 is an enlarged side elevational view of still yet a further embodiment of the fastener member represented in FIG. 5, constructed according to the principles of the present invention.
Figure 16:
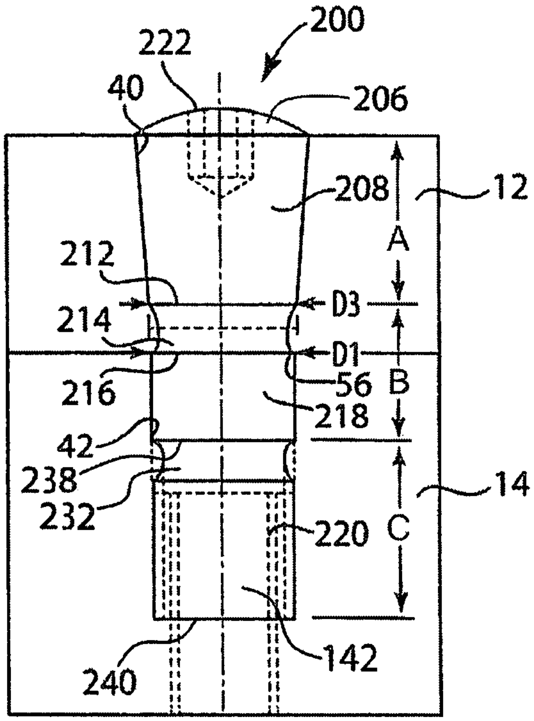
FIG. 16 is an exemplary side elevational view of a die holder plate and the punch holder plate shown joined together as a compound plate assembly with a securement member of the present invention represented in FIG. 15 shown alignably and grippingly arranged therethrough.

A further preferred embodiment of the present invention comprises an elongated securement member 200, as represented in FIG. 15. The elongated securement member 200, shown in FIG. 15, is also shown arranged within a $1^{st}$ or upper plate 12 and a $2^{nd}$ or lower plate 14 as represented in FIG. 16. The elongated securement member 200 has a $1^{st}$ or upper half end portion 202 and a lower half or $2^{nd}$ end portion 204, as shown in FIG. 15. The uppermost end 206 of the upper half end portion 202 is of somewhat hemispherical or finger recognizable curvilinear shape, as may be seen in FIGS. 15 and 16. The elongated securement member 200 has an upper, conically shaped side surface 208 comprising about one $3^{rd}$ of the length of the elongated securement member 200, critically tapered at an angle "T" of about 7 to about 14° with respect to its longitudinal axis "L" as represented in FIG. 15. The tapered, minimally sloped 7 to 14 degree critical configuration 208 has a lowermost end 210 which defines the "upper" end of a circumferentially arranged upper transition perimeter 212 which is circular and may be of a diameter D3 adjacent a first strain relief channel 214.

The first annular strain relief channel 214, best seen in FIG. 15, functions as a strain relief and is arranged about the elongated securement member 200 distally adjacent the circumferentially arranged upper transition perimeter 212, wherein the annular channel 214 has a circumferentially arranged lower transition perimeter 216. Distal of the first annular channel 214 is cylindrical portion 218 of diameter D1. A second annular channel 232 is distal of cylindrical portion 218. The annular channels 214 and 232 may have a preferred radius of curvature similar to those of the aforementioned embodiments. The diameter D3 of the upper circular transition perimeter 212 of the first annular channel 214 is larger than the diameter D1 of its lower transition perimeter 216. A smooth dowel-like cylindrical portion 218 of the elongated securement member 200 extends distally from the lower transition perimeter 216 to an upper transition perimeter 238 of second strain relief annular channel 232, comprising preferably about one third of the length the lower portion 204 of the elongated securement member 200, having a diameter accordingly fitted to the diameters of a cylindrical portion 56 in the upper plate 12 and into the non-threaded smooth cylindrical portion 42 of the lower plate 14. A threaded portion 220 of the distalmost portion of the elongated securement member 200 comprises the remaining distalmost portion of the elongated securement member 200, extending from the lower transition perimeter 236 of the second annular channel 232, as seen in FIG. 15. The proximalmost (upper) end 206 of the elongated securement member 200 has a tool-receiving tool engaging socket opening 222 therein for receipt of an adjustment device such as an Allen wrench of the like, for the turning of the securement member 200 within the respective plate members 12 and 14.

The preferred $6^{th}$ embodiment securement member 200 is an elongated faster device comprising an upper third portion "A" having an elongated gently tapered conical portion critically of 7 to 14° with respect with longitudinal axis "L" to an upper transition perimeter 212 having a diameter D3 at the first upper annular channel 214. The securement member 200 has a middle third portion "B" extending from the upper transition portion 212 of the first annular channel 214 generally to the lower transition perimeter 238 of the lower or second annular channel 232. The second annular channel 232 has an upper transition perimeter 238, as shown in FIGS. 15 and 16.

Securement member fastener device 200 also comprises a distal or lower third portion "C" extending from the upper transition perimeter 238 of the second annular channel 232 to its lower or distal end 240 of the fastener device 200, as shown in FIGS. 15 and 16. The faster device 200 has both the lower third portion "C" and most of the mid-third portion "B" extending effectively into the thicker lower plate 14, as shown in FIG. 16. The lower plate 14 is typically thicker than the upper plate 12, as may be seen in the drawing, and particularly in FIG. 16, for example. The punch holder plate 14 needs to be thicker because of the stresses involved, hence the fastener device 200 has the lower two-thirds of its length secured to therewithin. The faster device 200 insertion process is best assembled with the upper and lower plates 12 and 14 utilizing both the adjustment grooves found at each end of that fastener device 200.

The invention thus consists of an elongated fastener device for enabling the securement of a first thin plate and a second thicker plate together, the elongated device consisting of three portions (A, B, C) of generally equal length, a proximal or upper first portion, an intermediate or middle portion and a lower or distal portion; wherein the first portion (A) of the elongated fastener device comprises a smooth conical side surface from an upper end thereof, which side surface is tapered at an angle of between 7° to 14° with respect to a longitudinal axis of the elongated device, the smooth conical surface having a lower end ending at a first transition perimeter (212) of a first strain relief channel (214); wherein the second portion of the elongated fastener device comprises the first strain relief channel (214), a second transition perimeter (216) of smaller diameter than the first transition perimeter (212) thereof, the second portion extending distally and is of cylindrical shape and a diameter equal to the diameter of the second transition perimeter (216) of the first strain relief channel (214) and is arranged so as to be able to extend from the second transition perimeter (216) at the juncture "J" of a first plate and into a bore (42) of a second thicker plate (14), the second portion (B) of the elongated fastener device (200) distally ending at a first transition perimeter (212) of a second strain relief channel (232); and wherein third portion (C) of the elongated fastener device comprises a second strain relief channel (232) defined by an uppermost first transition channel (238) and a lowermost second transition channel (236) with a threaded section (220) extending therefrom distally to the distalmost end (240) of the elongated fastener device; and wherein a tool receiving bore (142) extends into the threaded section of the third portion (C) of the elongated fastener device, and a tool receiving first bore (222) extends into the first portion (A) of the elongated fastener device, to enable rotation engagement with a first (12) and a second plate (14) being joined, from either side thereof. The invention includes the upper end of the first portion comprising curvilinear surface (206) through which the tool receiving bore (222) extends. The invention also consists of wherein the second transition perimeter (216) of first strain relief channel 214 in the second portion "B" of the elongated faster device is arranged to lie at the juncture of a first plate (12) and a second plate (14), where the elongated fastener device is arranged to extend between and secure a first plate to a second plate.

The die plate and holding plate securement arrangement of a punch press machine assembly comprises an elongated fastener device for enabling the securement of a first thin plate 12 and a second thicker plate 14 together, the plane of their touched-meeting defined as their juncture "J". The elongated fastener device 200 consisting of three portions of generally equal length, a proximal or upper first portion (A), an intermediate or middle portion (B) and a lower or distal portion (C); wherein the first portion A of the elongated fastener device comprises a smooth conical side surface 208 from an upper end thereof, which side surface is tapered at a critical angle of between 7° to 14° with respect to a longitudinal axis "L" of the elongated device, for smoothly compressing a corresponding conically shaped gradually-tapering bore 40 in the first thin plate 12, the smooth conical surface 208 having a lower end ending at a first transition perimeter 212 of a first strain relief channel 214; wherein the second portion B of the elongated fastener device, as shown in FIG. 16, comprises the first strain relief channel 214, a second transition perimeter 216 of smaller diameter than the first transition perimeter 212 thereof, (D3>D1), the second portion 218 extending distally and being of cylindrical shape and a diameter equal to the diameter of the first transition perimeter 212 of the first strain relief channel and is arranged so as to be able to extend from the first transition perimeter 212 with its second transition perimeter 216 transversely adjacent the juncture "J" of the first and second plates (12 & 14), as shown in FIG. 16, and into a bore of the second thicker plate 14, the second portion of the elongated fastener device distally ending at a first transition perimeter 238 of a second strain relief channel 232 positioned within the second plate 14; and wherein third portion (C) of the elongated fastener device 200 comprises a second strain relief channel 232 defined by the uppermost transition perimeter 238 and the lowermost end 240 of fastener device 200, with an external threaded section 220 extending therearound, distally to the distalmost end 240 of the elongated fastener device 200; and wherein a tool receiving second bore 142 extends into the threaded section 220 of the distalmost end of the third portion C of the elongated fastener device 200, and wherein the first bore 222 extends into the first portion 206 of the elongated fastener device 200, to enable adjustable rotation engagement with a set of first and the second plates 12 and 14, being adjustably joined, from either or both ends thereof. The invention also consists of the die plate and holding plate securement arrangement of a punch press machine assembly, wherein the second strain relief channel is arranged between the second portion of the elongated fastener device and the treaded section of the third portion of the elongated fastener device.

I claim:

1. An elongated fastener device for enabling the securement of a first thin plate (12) and a second thicker plate (14) together, the elongated device consisting of three portions of generally equal length, an upper portion (A), a middle portion (B) and a lower portion (C);

wherein the upper portion (A) of the elongated fastener device consists of a smooth conical side surface, which is tapered at an angle (T) of between 7° to 14° with respect to a longitudinal axis (L) of the elongated fastener device, the smooth conical surface having a lower end ending at a first transition perimeter (212) of a first strain relief channel (214);

wherein the middle portion (B) of the elongated fastener device consists of the first strain relief channel (214), a second transition perimeter (216) of a smaller diameter than the first transition perimeter (212), the middle portion extending a length along the longitudinal axis is cylindrically shaped and has a diameter equal to the diameter of the second transition perimeter (216) of the first strain relief channel (214), and the second transition perimeter (216) extends from a juncture (J) defined by an abutting arrangement of the first thin plate and the second thicker plate and into a bore (42) of a second thicker plate (14), the middle portion (B) of the elongated fastener device distally ending at a first transition perimeter (238) of a second strain relief channel (232); and wherein the lower portion (C) of the elongated fastener device consists of a second strain relief channel (232) defined by an uppermost first transition perimeter (238) and a lowermost second transition perimeter (236) with a threaded section (220) extending from the lowermost second perimeter to a distalmost end (240) of the elongated fastener device; and wherein a tool receiving bore (142) extends into the threaded section of the lower third portion (C) of the elongated fastener device, and a tool receiving bore (222) extends into the first upper portion (A) of the elongated fastener device, the enable a tool driven rotational engagement with the first thin plate (12) and the second thicker plate (14).

2. The elongated fastener device as recited in claim 1, wherein the upper end of the first upper portion comprises a curvilinear surface (206) through which the tool receiving bore (222) extends.

3. The elongated fastener device as recited in claim 1, wherein the second transition perimeter (216) of the first strain relief channel (214) is arranged to lie transversely adjacent the juncture (J) of the first plate (12) and the second plate (14) and secure the first thin plate (12) to the second thicker plate (14).

4. A die plate and holding plate securement arrangement for a punch press machine assembly, the securement arrangement comprising:

an elongated fastener device (200) for enabling the securement of a the die plate (12) and a the holding plate (14) of a punch press assembly, the elongated device (200) consisting of three portions of generally equal length, a proximal or first upper portion (A), a middle portion (B) and a lower portion (C);

wherein the first upper portion (A) of the elongated fastener device (200) comprises a smooth conical side surface (208), which is tapered at angle (T) of between 7° to 14° with respect to a longitudinal axis (L) of the elongated device (200), for smoothly compressing a corresponding conically shaped bore (40) in the die plate (12), the smooth conical surface having a lower end ending at a first transition perimeter (210) of a first strain relief channel (214);

wherein the middle portion (B) of the elongated fastener device (200) consists of the first strain relief channel (214), a second transition perimeter (216) of smaller diameter than the first transition perimeter (212), the middle portion (B) extending a length along the longitudinal axis is cylindrically shaped and has a diameter equal to the diameter of the first transition perimeter of the first strain relief channel and the second transition perimeter extends from a juncture defined by an abutting arrangement of the die plate and the holding plate and into a bore of the holding plate (14), the middle portion (B) of the elongated fastener device distally ending at a first transition perimeter (238) of a second strain relief channel (232); and wherein the lower portion (C) of the elongated fastener device (200) consists of the second strain relief channel (232) defined by the first transition perimeter (238) and the second strain relief channel (232) with a threaded section (220) extending distally to a distalmost end (240) of the elongated fastener device; and wherein a tool receiving bore (142) extends into the threaded section of the distalmost end (240) of the lower portion (C) of the elongated fastener device (200), and a tool receiving bore (222) extends into the first upper portion (A) of the elongated fastener device (200), to enable adjustable rotational engagement within a set of die and holding plates (12 and 14) being adjustably joined, from either or both sides thereof.

5. The die plate and holding plate securement arrangement of a punch press machine assembly, as recited in claim 4, wherein the second strain relief channel (232) is arranged between the middle portion (B) of the elongated fastener device (200) and the threaded section (220) of the lower portion (C) of the elongated fastener device (200).

6. The die plate and holding plate securement arrangement of a punch press machine assembly, as recited in claim 4, wherein the second transition perimeter (216) of the first strain relief channel (214) is in transverse alignment with the junction (J) of the die plate (12) and the holding plate (14).

* * * * *